US011465133B2

(12) United States Patent
Kim et al.

(10) Patent No.: US 11,465,133 B2
(45) Date of Patent: Oct. 11, 2022

(54) HIGH-PERFORMANCE ZEOLITE FOR REDUCING NITROGEN OXIDE EMISSIONS, METHOD OF PREPARING SAME AND CATALYST USING SAME

(71) Applicants: HYUNDAI MOTOR COMPANY, Seoul (KR); KIA Motors Coporation, Seoul (KR); HEESUNG CATALYSTS CORPORATION, Siheung-si (KR)

(72) Inventors: Pyung Soon Kim, Suwon-si (KR); Young Jin Kim, Hwaseong-si (KR); Chang Hwan Kim, Seongnam-si (KR); Seung Chui Na, Seoul (KR); Seung Ho Oh, Cheongju-si (KR); Young San Yoo, Incheon (KR); Ho Dong Kim, Siheung-si (KR)

(73) Assignees: Hyundai Motor Company, Seoul (KR); Kia Motors Corporation, Seoul (KR); Heesuna Catalysts Corporation, Siheung-si (KR)

( * ) Notice: Subject to any disclaimer, the term of this patent is extended or adjusted under 35 U.S.C. 154(b) by 0 days.

(21) Appl. No.: 17/009,235

(22) Filed: Sep. 1, 2020

(65) Prior Publication Data
US 2021/0069685 A1 Mar. 11, 2021

(30) Foreign Application Priority Data
Sep. 9, 2019 (KR) .................. 10-2019-0111250

(51) Int. Cl.
*B01J 29/76* (2006.01)
*B01J 29/63* (2006.01)
*B01J 35/10* (2006.01)
*B01J 35/04* (2006.01)
*B01J 37/00* (2006.01)
*B01J 37/02* (2006.01)
*B01J 37/30* (2006.01)
*B01J 37/04* (2006.01)
*B01J 37/10* (2006.01)
*B01D 53/94* (2006.01)
*B01J 35/02* (2006.01)
*C01B 39/14* (2006.01)
*B01J 37/03* (2006.01)
*B01J 29/04* (2006.01)

(52) U.S. Cl.
CPC .......... *B01J 29/63* (2013.01); *B01D 53/9418* (2013.01); *B01J 29/041* (2013.01); *B01J 29/044* (2013.01); *B01J 29/7607* (2013.01); *B01J 35/023* (2013.01); *B01J 35/026* (2013.01); *B01J 35/04* (2013.01); *B01J 35/109* (2013.01); *B01J 35/1023* (2013.01); *B01J 37/0018* (2013.01); *B01J 37/0203* (2013.01); *B01J 37/0209* (2013.01); *B01J 37/038* (2013.01); *B01J 37/04* (2013.01); *B01J 37/10* (2013.01); *B01J 37/30* (2013.01); *C01B 39/145* (2013.01); *B01D 2255/20761* (2013.01); *B01D 2255/50* (2013.01); *B01D 2255/9155* (2013.01); *B01D 2255/9207* (2013.01); *B01D 2257/404* (2013.01); *B01D 2258/01* (2013.01); *B01D 2258/012* (2013.01); *B01J 2229/186* (2013.01); *B01J 2229/34* (2013.01); *B01J 2229/36* (2013.01); *B01J 2229/38* (2013.01)

(58) Field of Classification Search
CPC .... B01J 29/7607; B01J 29/041; B01J 29/044; B01J 2229/186; B01J 2229/34; B01J 2229/36; B01J 2229/38; B01D 53/8628; B01D 53/9418; B01D 2257/404; B01D 2258/01; B01D 2258/012; B01D 2255/50; B01D 2255/9155; B01D 2255/9207; B01D 2255/20761; C01B 39/145
USPC .......... 502/60, 502; 423/700, 702, 704, 705, 423/706
See application file for complete search history.

(56) References Cited

U.S. PATENT DOCUMENTS

| 7,601,662 B2 | 10/2009 | Bull et al. | |
| 2017/0233258 A1* | 8/2017 | Hong | B01D 53/944 423/704 |

FOREIGN PATENT DOCUMENTS

| EP | 2 150 328 B1 | 3/2015 |
| KR | 10-2017-0095118 A | 8/2017 |

OTHER PUBLICATIONS

Ahn et al., "The Origin or an Unexpected Increase in NH3-SCR activity of Aged Cu-LTA Catalysts", ACS Catal., 2017, 7, pp. 6781-6785.*
Jo et al., "Economical synthesis of high-silica LTA zeolites: A step forward in developing a new commercial NH3-SCR catalyst", Applied Catalysis B: Environmental 243, 2019, pp. 212-219.*
Ryu et al., "Nature of active sites in Cu-LTA NH3-SCR catalysts: A comparative study with Cu-SSZ-13", Applied Catalysis B: Environmental 245, 2019, pp. 513-521.*

(Continued)

*Primary Examiner* — Elizabeth D Wood
(74) *Attorney, Agent, or Firm* — Morgan, Lewis & Bockius LLP

(57) ABSTRACT

Disclosed is a method of preparing a high-performance zeolite catalyst for reducing nitrogen oxide emissions, and more particularly a technique for preparing a zeolite catalyst, suitable for use in effectively removing nitrogen oxide (NOx), among exhaust gases emitted from vehicle internal combustion engines through selective catalytic reduction (SCR), thereby exhibiting high efficiency, high chemical stability and high thermal durability upon SCR using the prepared catalyst.

4 Claims, 7 Drawing Sheets

(56) References Cited

OTHER PUBLICATIONS

Ryu and Ahn et al., "Fully Copper-Exchanged High-Silica LTA Zeolites as Unrivaled Hydrothermally Stable NH3-SCR Catalysts", Angewandte Chemie International Edition, vol. 56, Issue 12, pp. 3256-3260.*
Boal, Ben W et al., Chem. Mater., 2015, 27 (22), pp. 7774-7779.
Choo, Soo Tae, et al., Appl. Catal. B Environ., 2003 44, pp. 237-252.
Jo, Donghui, et al., ACS Catal., 2016, 6, pp. 2443-2447.
Seo, Chong-Kil et al., J. Ind. Eng. Chem., 2015, 25, pp. 239-249.
Shan, Wenpo et al., Appl. Catal. B Environ., 2012, 115-116, pp. 100-106.

* cited by examiner

[Zeolite powder]   [Cu-impregnated zeolite powder catalyst]

[Cu-impregnated zeolite catalyst applied on filter]

(Photograph)      (Electron microscope image)

[Cu-impregnated zeolite catalyst applied on honeycomb]

(Photograph)      (Electron microscope image)

HIGH-PERFORMANCE ZEOLITE FOR REDUCING NITROGEN OXIDE EMISSIONS, METHOD OF PREPARING SAME AND CATALYST USING SAME

CROSS REFERENCE TO RELATED APPLICATION

The present application claims priority to and the benefit of Korean Patent Application No. 10-2019-0111250, filed on Sep. 9, 2019, the entire contents of which are incorporated herein by reference.

FIELD

The present disclosure relates to a method of preparing a high-performance zeolite catalyst for reducing nitrogen oxide emissions, and particularly a technique for preparing a zeolite catalyst, suitable for use in effectively removing nitrogen oxide (NOx) among exhaust gases emitted from vehicle internal combustion engines through selective catalytic reduction (SCR), thereby exhibiting high efficiency, high chemical stability and high thermal durability upon SCR using the prepared catalyst. Moreover, in preparing the zeolite, initial saturation nucleation and rapid nuclear growth are induced through a two-step temperature-elevating hydrothermal synthesis process, and a structure-directing agent (SDA) is directly contacted/substituted with a halogen anion in a liquid phase that is then allowed to react with silica and aluminum, thereby forming a desired zeolite skeleton.

BACKGROUND

The statements in this section merely provide background information related to the present disclosure and may not constitute prior art.

Nitrogen oxide (NOx), which is generated by reacting atmospheric nitrogen with oxygen during the combustion of fuel at high temperatures, is the main pollutant that causes acid rain or smog. Representative examples thereof include nitrogen monoxide (NO) and nitrogen dioxide (NO2), which are mainly emitted from diesel vehicles, aircraft, and fixed pollution sources (coal and thermal power plants, etc.). In order to reduce NOx emission from vehicle exhaust gas, European countries are applying diesel gas emission regulatory standards (EURO-6) in phases, and in the United States, the application of zero-emissions vehicles (ZEVs) is expanding. Meanwhile, SCR reactions have been most effectively used as a process for reducing NOx emissions. This reaction is based on the principle of converting NOx into nitrogen (N2) and water (H2O) by jetting a reducing agent such as ammonia (NH3) or urea after forming a catalyst layer on the exhaust gas emission area. The reaction formulas are represented below.

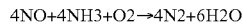

4NO+4NH3+O2→4N2+6H2O

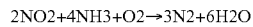

2NO2+4NH3+O2→3N2+6H2O

Conventionally, as a catalyst used in the SCR reaction for vehicle exhaust gas treatment, a vanadia-titania-based (V2O5/TiO2) catalyst and a metal-zeolite-based catalyst have been mainly studied. (C.-K. Seo et al., J. IND. ENG. CHEM., 25, 239-249 (2015); Wenpo Shan et al., APPL. CATAL. B: ENVIRON., 115-116, 100-106 (2012); S. T. Choo et al., APPL. CATAL. B: ENVIRON., 44, 237-252 (2003)).

Vanadium-based catalysts exhibit high activity in the range of 300-400° C., but are problematic in that SCR activity is significantly lowered at a high temperature of 400° C. or more. This is deemed to be because vanadia begins to melt and titania is sintered or phase-changed at high temperatures, which is attributed to low activity. Studies have been conducted to maintain high-temperature stability by adding various enhancers, but there are limitations in treating vehicle exhaust gases at high temperatures. In contrast, the zeolite catalyst shows stable activity without phase change or skeletal collapse in zeolite even at high temperatures of 600° C. or more. Extensive research into zeolite catalysts for SCR has been carried out since the 1980s, and continues to this day.

Zeolite is also referred to as crystalline aluminosilicate, and has been reported to have various skeletons and pore sizes. Mesoporous ZSM-5 zeolite was first mainly studied for the SCR reaction, followed by various zeolite structures such as BEA, MOR, FER, FAU and the like. However, since these zeolites have the disadvantage of being vulnerable to water generated after the SCR reaction, the hydrothermal durability of zeolite catalysts is lowered, presenting an obstacle to commercialization. Hence, extensive and intensive research into microporous zeolite having high-content silica is ongoing because there are reports that the smaller the pore opening, the more difficult it is for molecules other than the SCR reactant to pass through, thus exhibiting high selectivity, and also that the zeolite surface becomes hydrophobic when the silica content in zeolite is high, thus increasing hydrothermal stability.

Accordingly, BASF and Johnson Matthey Inc. have reported Cu-SSZ-13 in which copper is ion-exchanged with CHA-structured zeolite having micropores having a pore size of 4 Å or less (U.S. Pat. No. 7,601,662) and Cu-SAPO-34 (European Patent No. EP2150328B1), both of which have hydrothermal stability and manifest high NOx conversion efficiency across the entire range from low temperatures to high temperatures, and thus these zeolites have begun to be widely utilized as vehicle SCR catalysts.

However, exhaust gas emission regulations have become more stringent recently, so in the newly applied SCR-catalyzed diesel particulate filter (SDPF) system, which combines an SCR and a diesel particulate filter (DPF), the catalyst is often exposed to temperatures of 800° C. or higher, and thus, Cu-CHA and Cu-SAPO-34 also show a limit in durability.

Recently, Ben W. Boal et al. (27 CHEM. MATER., 7774-79 (2015)) newly synthesized high-silica-content LTA zeolite using an imidazole-based structure-directing agent (SDA), instead of low-silica-content LTA zeolites, which are generally known to have poor high-temperature durability. This document proposed the prepared zeolite as a catalyst for an MTO (Methanol-To-Olefin) process reaction, rather than an SCR reaction, but a very meaningful result was obtained in that the zeolite is capable of maintaining a stable structure without structural collapse at high temperatures. Additionally, Donghui Jo et al. (6 ACS CATAL. 2443-47 (2016)) and Korean Patent Application Publication No. 10-2017-0095118 disclose high-silica-content LTA zeolite, which is capable of being maintained even at high temperatures of 800° C. or more during the high-temperature SCR reaction. Therefore, these two documents are examined in more detail with an eye to commercial production. In the preparation method disclosed by Ben W. Boal and in Korean Patent Application Publication No. 10-2017-0095118, an imidazole-based hydroxide solution (first mixture) is first prepared, a silicon material (TEOS; tetraethyl orthosilicate), an aluminum material (aluminum hydroxide) and an organic template (TMAOH, tetramethylammonium hydroxide pentahydrate) are added thereto (second mixture), water and ethanol produced through hydrolysis of TEOS are heated/removed (third mixture), and hydrogen fluoride is added thereto, followed by hydrothermal reaction, resulting in a final product (fourth mixture). Here, the third mixture contains almost no water, and thus, when hydrogen fluoride is added thereto, only the acid-base reaction mainly occurs, thus intensively generating fumes, which is very disadvantageous for mass production. Moreover, although uniform mixing has to be achieved since the mixing of the third mixture and hydrogen fluoride is intended to substitute the hydroxyl group of the third mixture with fluorine of hydrogen fluoride, the mixing of the solid phase (third mixture) and the liquid phase (hydrogen fluoride, 50% concentration) has the disadvantage of causing nonuniformity, which affects the crystallinity of the final product. Furthermore, during the rapid reaction between the third mixture and hydrogen fluoride, fluorine located at the terminal of SDA is trapped in the finally prepared LTA zeolite skeleton, and is not removed even after heat treatment and is partially left behind. Thus, it may react with ammonia, which is a reducing agent introduced upon the actual SCR reaction, yielding ammonium fluoride and undesirably resulting in a collapsed zeolite skeleton.

In addition, Cu-LTA zeolite is prepared in a manner in which, in the process of preparing a catalyst by impregnating copper in order to exhibit the SCR reaction activity, conversion of LTA zeolite into NH4-LTA using ammonium nitrate two times and then impregnating using copper acetate three times are performed. However, we have discovered that the above preparation process is complicated and processing costs are high, and moreover, the catalyst produced using the above zeolite is expensive, and thus limitations are imposed on the actual commercial application thereof.

SUMMARY

The present disclosure provides high-silica-content copper-impregnated LTA zeolite having high catalytic activity and superior high-temperature hydrothermal stability and base durability suitable for use in an SCR reaction for reducing vehicle exhaust gas emissions, economical preparation of a catalyst using the same, and a preparation method thereof.

The present disclosure provides a method of preparing a high-silica-content LTA zeolite catalyst using a fluorine-substituted structure-directing agent (SDA-F) in which the hydroxyl group of a structure-directing agent is substituted with a fluorine ion, a silicon material, an aluminum material, and an organic template, in which a structure-directing agent solution, particularly an imidazole-based structure-directing agent substituted with a fluorine ion through ion exchange, is added with an ammonium-containing colloidal silica solution as the silicon material, so that the reaction is carried out in a stable solution-to-solution manner, and moreover, the zeolite skeleton may be uniformly formed for the nucleation time in a synthesis mother liquor using a two-step temperature-elevating hydrothermal synthesis process. Furthermore, the prepared zeolite catalyst may manifest excellent durability after exposure to high temperatures and an ammonia reducing agent.

In addition, the present disclosure provides a method of preparing a Cu-LTA catalyst, in which the LTA zeolite prepared above is impregnated with a copper ion in order to produce a catalyst for SCR. Here, impregnating may be performed once using an amine-based copper precursor or three times using an acetate-based copper precursor.

In addition, the present disclosure provides an SCR method, including subjecting the copper-impregnated LTA zeolite catalyst in a fresh state to hydrothermal treatment to 900° C./aging in a base atmosphere, and reducing and removing nitrogen oxide in the presence of the catalyst in a fresh state and after hydrothermal treatment/base treatment.

The LTA zeolite prepared by the method of the present disclosure is capable of exhibiting high crystallinity and a specific surface area, and unit particles are uniformly prepared as single particles in cube form, from which nucleation and nuclear growth are evaluated to occur uniformly for all starting materials during the preparation of zeolite. In addition, the LTA zeolite is subjected to ion exchange using amine-based copper for use as a catalyst, thereby exhibiting high activity in the SCR reaction at both low temperatures and high temperatures as well as crystallinity in the fresh state and after high-temperature hydrothermal treatment/base treatment. Here, the zeolite skeleton remains relatively stable.

As a result, it is possible to prepare SCR catalysts that enable economical commercialization and additionally have high activity and durability through simplification of the preparation process and the specific synthesis method compared to conventional methods.

Further areas of applicability will become apparent from the description provided herein. It should be understood that the description and specific examples are intended for purposes of illustration only and are not intended to limit the scope of the present disclosure.

DRAWINGS

In order to better understand the disclosure, there will now be described various forms thereof, given by way of example, reference being made to the accompanying drawings in which.

Figure 6:
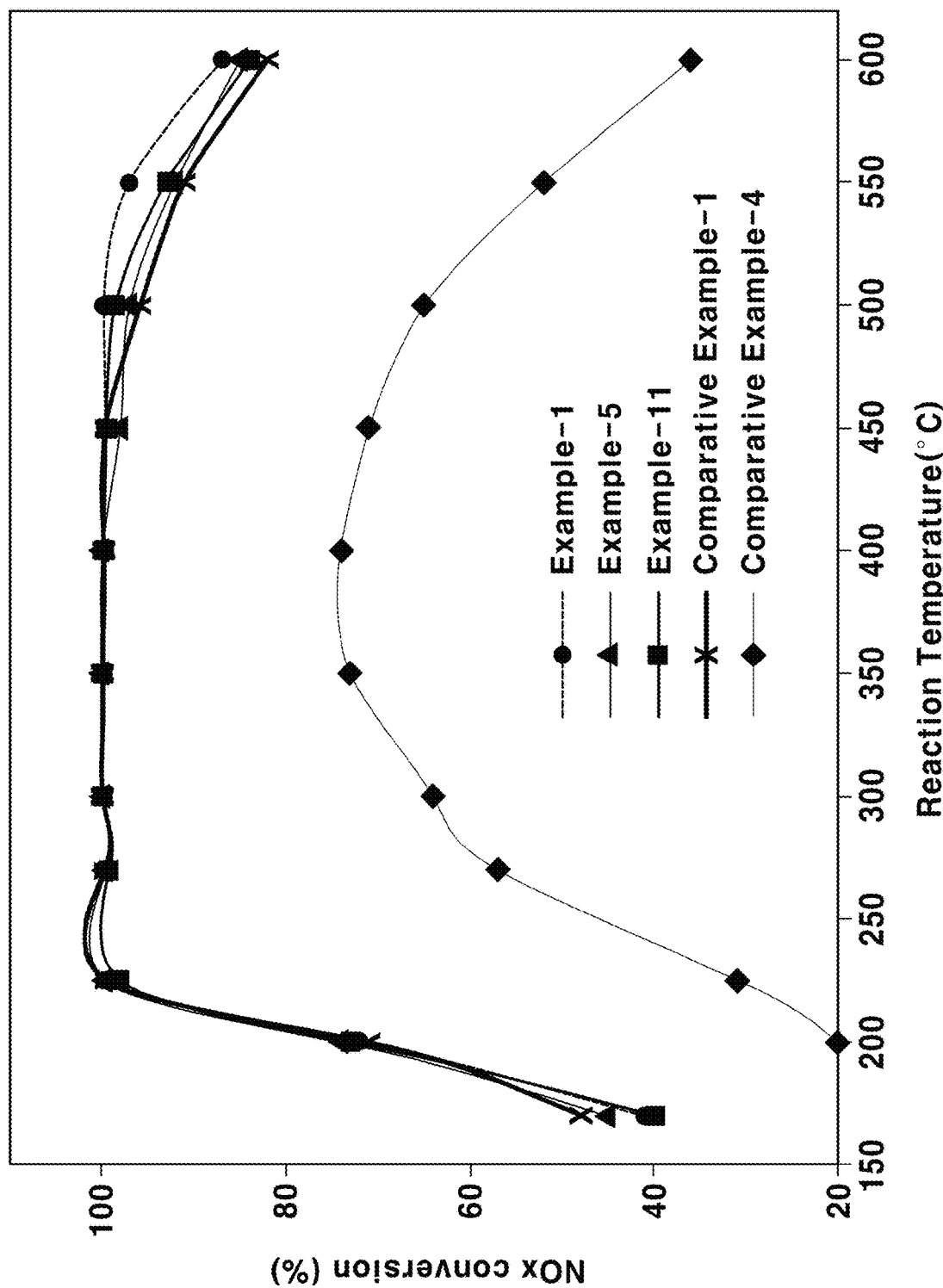
Figure 7:
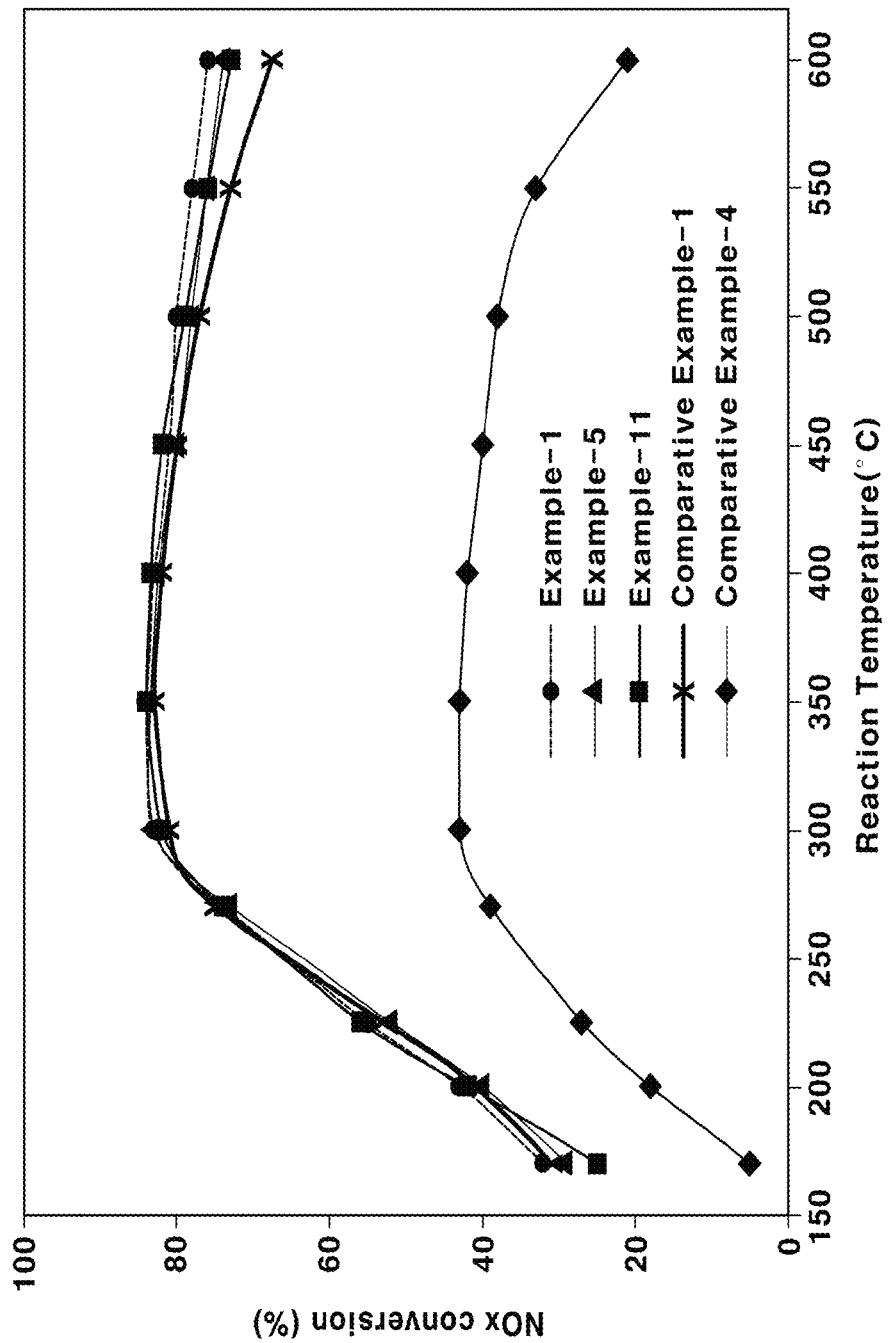

FIG. 6 shows the results of SCR reaction using the zeolite catalysts prepared in Examples 1, 5 and 11 of the present disclosure and Comparative Examples 1 and 4; and FIG. 7 shows the results of SCR reaction after hydrothermal treatment of the zeolite prepared in Examples 1, 5 and 11 of the present disclosure and Comparative Examples 1 and 4.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure pertains to the preparation of high-silica-content LTA zeolite and a copper-impregnated LTA zeolite catalyst for use in SCR reaction to reduce nitrogen oxide emissions.

The zeolite according to the present disclosure is a high-silica-content LTA zeolite having a silicon/aluminum molar ratio of 8 or more, and preferably a silicon/aluminum molar ratio of 10-16. If the silicon/aluminum molar ratio is less than 8, the catalytic activity is good, but the high-temperature hydrothermal stability deteriorates rapidly, which is unsatisfactory for use as a catalyst for SCR reaction. On the other hand, if the silicon/aluminum molar ratio exceeds 16, although durability and heat resistance increase with an increase in the molar ratio, acidity decreases, and thus deactivation occurs at low temperatures during the catalytic reaction.

In the present disclosure, the hydrothermal stability evaluation confirmed the hydrothermal stability and heat resistance based on zeolite crystallinity and SCR reaction activity after high-temperature heat treatment in the presence of water. Moreover, the crystallinity was analyzed after exposure of the prepared LTA zeolite to a base atmosphere for about 100-200 hr to evaluate durability in ammonia, a reducing agent used in the SCR reaction.

In the present disclosure, the prepared LTA zeolite has a particle size of 0.5-5 μm, and the optimal particle size may vary depending on the reaction purpose. In particular, zeolite for SCR reaction may have a particle size of 0.5-3 μm. In the SCR reaction, a catalyst attached to a honeycomb carrier or a filter is used. Here, if the particle size is less than 0.5 μm, adhesion is good, but durability and heat resistance may decrease. On the other hand, if the particle size exceeds 3 μm, such particles may cause pore clogging when attached to the honeycomb or filter carrier, and adhesion thereof is weak, whereby zeolite easily peels from inside and outside the carrier.

In the present disclosure, the properties of the prepared LTA zeolite were analyzed using the following instruments. The structure and crystallinity analysis was performed using an X-ray diffraction (XRD) meter, and the particle shape of the prepared zeolite was measured using a scanning electron microscope (SEM). Moreover, components and content were measured through X-ray fluorescence (XRF), and zeolite pores and specific surface area were measured using a nitrogen adsorption analyzer (BET $N_2$ physisorption).

Figure 1:
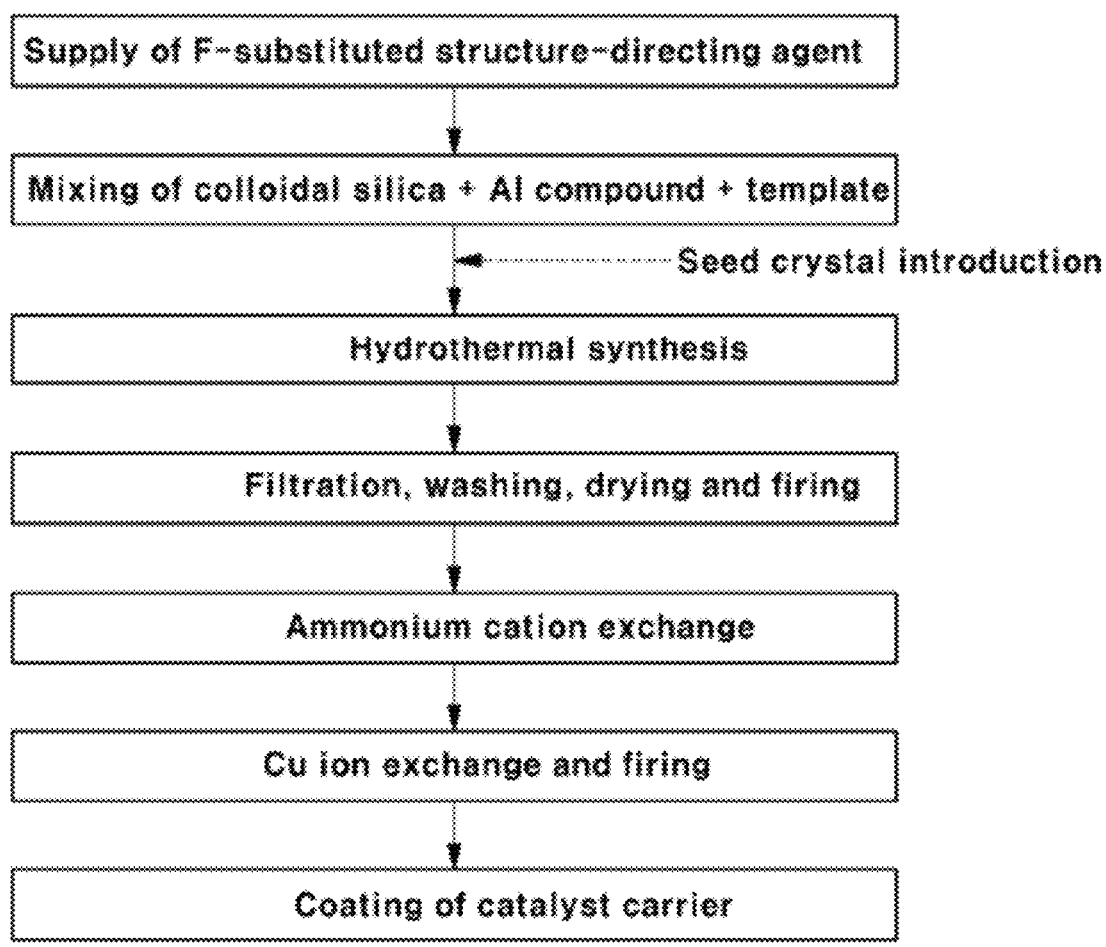
FIG. 1 is a flowchart showing a preparation process according to one form of the present disclosure.

FIG. 1 illustrates a flowchart of the process of preparing a catalyst, which specifically describes the method of preparing LTA zeolite according to the present disclosure. Also, a detailed description of catalyst preparation and SCR reaction using the same is given below.

First, the preparation of LTA zeolite, which is a catalyst material for SCR reaction, and detailed steps thereof are specified below.

1) Preparation of Structure-Directing Agent (SDA-F) and Zeolite Synthesis Mother Liquor The structure-directing agent used to prepare LTA zeolite in the present disclosure is an imidazole cation. Specifically, 1,2-dimethyl-4-methylbenzyl imidazolium hydroxide is prepared from 1,2-dimethylimidazole and 4-methyl benzyl chloride, after which the hydroxide anion is ion-exchanged with a halogen material, especially fluorine. Fluorine is used to attain thermal durability by increasing the density of the zeolite skeleton produced during synthesis. The fluorine material may be any one selected from among hydrogen fluoride, ammonium fluoride, sodium fluoride, potassium fluoride, and alkylammonium fluoride. In the present disclosure, it is preferable to use hydrogen fluoride or ammonium fluoride, containing no metal ions, in terms of economy and complexity of post-treatment (metal removal, etc.) after synthesis. Considering the danger of fluorine, it is preferred to use ammonium fluoride, which is a safe salt.

The mother liquor for the synthesis of LTA zeolite is prepared by adding an aluminum source, a silicon source and a tetramethylammonium cation as a template to the structure-directing agent prepared above, followed by homogeneous mixing through stirring and aging.

The aluminum source may be any one or a mixture of two or more selected from among aluminum sulfate, crystalline aluminum hydroxide, amorphous hydroxide aluminum oxide, aluminum chloride, aluminosilicate and aluminum metal. Among them, it is preferable to select a material that may be uniformly mixed with other synthesis materials in the preparation of the synthesis mother liquor, and in the present disclosure, aluminum hydroxide, especially amorphous aluminum hydroxide, is used.

The silica source may be any one or a mixture of two or more selected from among colloidal silica, precipitated silica, fumed silica, sodium silicate, tetraethyl orthosilicate, and aluminosilicate. Among them, it is preferable to select a material capable of being uniformly mixed with other synthesis materials in the preparation of the synthetic mother liquor, and in the present disclosure, colloidal silica containing an ammonium ion is used to make the pH of the synthetic mother liquor more basic.

Examples of the template may include tetramethylammonium hydroxide and tetramethylammonium chloride. Between the two, the use of tetramethylammonium hydroxide is preferred because it does not involve unnecessary post-treatment processes such as adding an additional alkali source to adjust the pH of the synthetic mother liquor or removing the chloride after the preparation of zeolite.

The aged synthetic mother liquor may be added with a seed crystal before introduction into the hydrothermal synthetic vessel. Although it is possible to synthesize LTA zeolite without a seed crystal, the use of a seed crystal aims to shorten the time of initial nucleation to thus realize a more economical synthesis. The seed crystal may be any zeolite having the sodalite skeleton desired to form a skeleton, particularly zeolite having the same LTA structure as the material desired to be synthesized. The Si/Al ratio in the skeleton of the seed crystal is preferably 1-30, particularly 10-20, and it is preferred to have the same ratio as the target ratio for synthesizing the zeolite. The amount of seed crystal that is used is not particularly limited, but is preferably about 1-5 wt %, corresponding to a seed crystal/silicon weight ratio within the range that does not negate economic benefits.

2) Synthesis of Zeolite

In the present disclosure, the LTA zeolite may be prepared by crystallizing the mixture of fluorine-substituted structure-directing agent, silicon source, aluminum source, template, water and seed crystal in a sealed pressure vessel at a predetermined temperature under a certain pressure for a predetermined time. In the crystallization process, the pressure vessel may be fixed or stirred. Stirring synthesis is preferred in order to achieve uniformity of crystal particles and avoid formation of unreacted materials.

The synthesis process may be performed at a temperature ranging from 100° C. to 200° C. In particular, the crystal growth step is carried out at a temperature ranging from 150° C. to 200° C. If the synthesis process is performed at a temperature lower than 100° C., zeolite crystals are formed late, and thus unreacted materials or impurities may be formed and the overall synthesis time becomes very long after termination of the synthesis, thus negating economic benefits. On the other hand, if the synthesis process is performed at a temperature higher than 200° C., the crystallinity of the prepared zeolite may be increased, but byproducts or other types of zeolite may be synthesized in addition to the LTA zeolite. The reaction time is not particularly limited, but considering the crystal growth time, the range of 15 hr to 30 hr is preferable. The pressure is not particularly limited, but it is preferable to carry out the reaction under intrinsic pressure generated by raising the temperature in the sealed vessel. In order to further increase the pressure, the reaction may be carried out by filling the inside of the vessel with an inert gas such as argon or nitrogen.

In the present disclosure, in addition to the above synthesis process, a two-stage temperature-elevating hydrothermal synthesis process is performed for uniform nucleation and crystal growth promotion of the mixture placed in the sealed pressure vessel. More specifically, the initial zeolite nucleation step is carried out at a low temperature, whereby all of the silicon and aluminum in the synthetic mother liquor are linked with the structure-forming agent and the template and crystal growth is retarded, after which the temperature is elevated to a high temperature, whereby all of the zeolite nuclei and crystals produced uniformly are grown at the same time, ultimately preparing zeolite having a uniform particle size at high yield. The low temperature preferably falls in the range of 100° C. to 120° C., and the high temperature preferably falls in the range of 150° C. to 200° C. The synthesis time is preferably 5-10 hr in the low temperature range and 10-15 hr in the high temperature range, thereby making it possible to synthesize LTA zeolite.

After completion of the synthesis, the zeolite product is separated in a solid phase through typically known filtration techniques (centrifugation, vacuum filtration, compression filtration, etc.) and is then washed with water or an organic solvent such as ethanol, methanol, acetone, or the like. The washed product is dried in an air circulation oven to remove water from the product. Here, the drying process may be performed at 100° C. to 120° C. for 12 hr to 24 hr. After drying, heat treatment is performed to remove organic matter remaining inside and outside the product. Here, the heat treatment may be conducted at 500° C. to 750° C. in an ambient atmosphere, particularly 550° C. to 650° C. If the heat treatment temperature is lower than 500° C., polymer material having a high molecular weight, among the organic matter in the product, may not be completely removed, and thus the pores in the skeleton may become clogged, which is undesirable. On the other hand, if the heat treatment temperature is higher than 750° C., skeletal rearrangement in the product may occur, thus causing aluminum phase transition, which may result in changed acid-site properties in zeolite.

3) Preparation of Zeolite Catalyst

The zeolite catalyst of the present disclosure may be produced in a powder form, and may also be prepared by coating a honeycomb or a filter with the zeolite powder through a typical process, for example, a wet impregnating process, a spray-coating process, a slurry-coating process, or the like.

The heat-treated LTA zeolite is impregnated with a copper ion for use as a catalyst for SCR and is thus provided in the form of Cu-LTA zeolite. Since the LTA zeolite prepared in the present disclosure contains a hydrogen cation, the hydrogen cation is first substituted with an ammonium (NH4+) ion before substitution with the copper ion. Although copper may be impregnated even when substitution with the copper ion in zeolite is directly performed without conversion into the ammonium cation, the ammonium ion exchange step has the effect of removing small amounts of impurities remaining in the zeolite by ammonium after heat treatment. Hence, it is preferred that the above step be conducted.

In the ammonium ion exchange step, a material containing an ammonium cation is diluted to 0.1-1.0 M with water and then added to the fired zeolite. The resulting mixture is stirred at 20° C. to 80° C. for 3 hr to 12 hr, filtered in a typically known manner, washed, and dried. The material containing the ammonium cation is not particularly limited, but typically includes ammonium nitrate or ammonium chloride. In particular, it is preferable to use ammonium nitrate, which makes it easy to remove the remaining material in the washing step.

In the copper ion exchange step, the ammonium-ion-exchanged zeolite is added with a copper precursor solution, stirred at 20° C. to 60° C. for 3 hr to 12 hr, filtered in a typically known manner, washed and dried. The copper precursor may be any one selected from among copper nitrate, copper chloride, copper acetate, and an amine-based precursor including tetraammine copper nitrate, tetraammine copper chloride and tetraammine copper sulfate. In the present disclosure, the ion exchange process is performed only once using tetraamine copper nitrate as a more economical impregnating process, rather than repeating impregnating using copper nitrate or copper acetate, filtration, washing and drying three times, whereby the resulting catalyst may exhibit the same copper-impregnating rate as in the catalyst obtained through the ion exchange process three times using copper nitrate or copper acetate.

In order to remove the precursor ion in the copper-impregnated zeolite prepared above and simultaneously to link the copper ion with aluminum in the zeolite skeleton, heat treatment is performed at 500° C. to 600° C. in an ambient atmosphere, ultimately preparing an LTA zeolite catalyst for SCR.

The zeolite catalyst prepared by the above method was confirmed to have a pure LTA structure through XRD analysis, and was measured to have a particle size of 0.5-5.0 μm through SEM. In addition, XRF analysis confirmed that the silicon/aluminum molar ratio fell in the range of 8.0-32.0 and that the Cu content in the zeolite fell in the range of 0.4-0.5 based on the copper/aluminum molar ratio. The specific surface area of the catalyst was as large as about 800 m2/g, indicating that the extent of storage of reducing agent and NOx was able to increase upon SCR, thereby improving the overall reaction conversion efficiency.

In addition, the high-silica-content copper-containing LTA zeolite catalyst prepared by the above method is evaluated through the following hydrothermal stability evaluation, base durability evaluation and SCR evaluation.

1) Evaluation of Hydrothermal Stability and Base Durability

For the copper-impregnated LTA zeolite catalyst prepared according to the present disclosure, the following preparation process was performed to evaluate hydrothermal stability after high-temperature heat treatment and durability after exposure to a base atmosphere. In the evaluation of hydrothermal stability, the zeolite powder catalyst prepared above, a honeycomb catalyst or a filter catalyst was placed in a heat treatment apparatus enabling air flow, water vapor and air were mixed, and the temperature thereof was elevated to 600° C.-900° C. from room temperature, followed by heat treatment for 1-25 hr. Although the water vapor/air ratio is not particularly limited, in the present disclosure, the hydrothermal treatment was performed under the condition of a gas hourly space velocity (GHSV) of 20,000 h−1 at a ratio of 5-10% water vapor/90-95% air, thereby preparing a hydrothermally treated catalyst.

For the evaluation of base durability, the zeolite powder catalyst prepared above, a honeycomb catalyst, or a filter catalyst was placed in a double jacket containing an aqueous ammonia solution adjusted to a pH of 9.0-9.5, and then left to be heated at 50-70° C. for 100-200 hr. The catalyst was then filtered and dried to afford a base-treated catalyst.

The hydrothermally treated and base-treated zeolites prepared above were measured and compared for zeolite skeletal collapse through XRD analysis and for residual F content through XRF.

2) Evaluation of SCR

The nitrogen oxide (NOx) conversion performance of the catalyst prepared above was evaluated as follows.

The reaction gas in a reactor is composed of 500 ppm of nitrogen monoxide (NO), 500 ppm of ammonia (NH3), 200 ppm of carbon monoxide (CO), 5% of carbon dioxide (CO2), 9.5% of oxygen and 5% of water in a nitrogen gas atmosphere, the gas hourly space velocity (GHSV) of the reaction gas is 80,000 h−1, and the composition of each component may vary depending on the reaction conditions. The reaction temperature was elevated from 150° C. to 600° C. at the time of introduction of the reaction gas into the reactor, and the nitrogen oxide conversion efficiency was measured.

A better understanding of the present disclosure will be given through the following examples and comparative examples, but the scope of the present disclosure is not limited thereto.

The preparation conditions of Examples 1 to 19 and Comparative Examples 1 to 10 are summarized in Table 1 below, and the preparation method will be described in detail below.

Example 1: SDA-F-Based Copper-Impregnated LTA Zeolite Catalyst

SDA-F used in Example 1 was prepared by the following method and named SDA-F-1. Specifically, 9.75 g of 1,2-dimethylimidazole (98.5%) was dissolved in 12 g of chloroform, and 14.2 g of 4-methyl benzyl chloride (99%) was added thereto with stirring. After a certain period of time, a precipitate began to form, the reaction was terminated after aging for 2 days, and the product was washed and filtered. Thereafter, a drying process was performed to completely remove residual chloroform and water, thereby obtaining 19 g of 1,2-dimethyl-4 methylbenzyl imidazolium hydroxide (hereinafter referred to as "1,2-DMI-4 MB-CI") crystal (yield: 78.4%). When the reaction filtrate was reused, 1,2-DMI-4 MB-CI dissolved in the solvent was precipitated therewith, and the yield increased to 122%. When the chloroform filtrate was reused five times, the average yield was 98.5%. The crystal prepared above was dissolved in 100 g of distilled water to give a 1,2-DMI-4 MB-CI aqueous solution, which was then passed through a column packed with an anion exchange resin having a hydroxyl group (OH) (MA-1OOH UP, Samyang) at a speed of 3 ml/min, thereby preparing 1,2-DMI-4 MB-OH in which the terminal CI ion of the crystal was exchanged with the OH ion. The concentration of the 1,2-DMI-4 MB-OH solution thus prepared was measured to be 15.2% using an HCl solution and a phenolphthalein indicator. In addition, a precipitation test using a silver nitrate solution was performed to confirm the presence of residual CI ion. As a result, no CI ion was detected in the solution, indicative of complete ion exchange. Finally, this solution was concentrated under reduced pressure at 80° C., and the concentration thereof was adjusted to 26%. Next, a cation exchange resin in which F was substituted at the terminal group was prepared. Specifically, an anion exchange resin having a terminal OH group (MA-1OOH UP, Samyang) was loaded into the column, and then a 0.1 mol ammonium fluoride (NH4F) aqueous solution was passed through the column at a speed of 3 ml/min, thereby substituting OH, which was previously attached to the resin, with F, resulting in an F-substituted cation exchange resin. The F-substituted cation exchange resin thus obtained was loaded into the column, through which a 1,2-DMI-4 MB-OH aqueous solution, obtained by dissolving the 1,2-DMI-4 MB-OH crystal prepared above in 100 g of distilled water, was then passed at a speed of 3 ml/min, thereby preparing SDA (hereinafter referred to as SDA-F-1) having a 1,2-DMI-4 MB-F structure having F substituted at the terminal, ultimately completing SDA having a concentration of 17% used in Example 1.

Next, the following procedure was performed to prepare a synthetic mother liquor used for hydrothermal synthesis. 21.9 g of the SDA-F-1 aqueous solution was added with 0.169 g of aluminum hydroxide (Al(OH)3, Aldrich) and 0.41 g of TMAOH (tetramethylammonium hydroxide pentahydrate, Aldrich), stirred for about 1 hr, further added with 6.67 g of a silica source, Ludox AS-40 (Aldrich), and 2% of LTA seed crystal based on the amount of silicon, and further stirred for about 24 hr. Subsequently, in order to adjust the concentration of the aqueous solution, an evaporation drying process was conducted, thereby yielding a synthetic mother liquor having a final concentration of 32%.

The prepared synthetic mother liquor was placed inside a vessel made of Teflon, sufficiently stirred, sealed in a stirrable stainless steel reactor, heated to 175° C., and subjected to hydrothermal reaction for 24 hr.

After termination of the reaction, the product was taken out of the reactor, filtered, washed, and dried in an air circulation oven at 100° C. for 12 hr. After drying, heat treatment was performed at 600° C. for 12 hr in a furnace to remove organic matter.

Finally, a process of impregnating copper on the synthesized LTA powder was performed. Before copper impregnating, the LTA zeolite powder was treated with 0.5 mol of an ammonium nitrate aqueous solution at 80° C. for 6 hr and thus ion-exchanged in the form of NH4-LTA, followed by filtration, washing, and drying at 60° C. for 12 hr. Then, the NH4-LTA zeolite powder ion-exchanged with ammonium was added to an aqueous solution of tetraamine copper nitrate (TACN), calculated so as to have a copper/aluminum molar ratio of 0.5, followed by stirring at room temperature for 6 hr, filtration, washing, drying in an oven at 60° C. for 12 hr and then firing at 550° C. for 4 hr, thereby preparing a copper-impregnated LTA zeolite catalyst. The results of analysis of the properties of the zeolite catalyst prepared above are summarized in Table 2 below, and the flowchart showing the preparation process thereof is briefly illustrated in FIG. 1.

Example 2: SDA-F-Based Copper-Impregnated LTA Zeolite Catalyst

A copper-impregnated LTA zeolite catalyst was prepared in the same manner as in Example 1, with the exception that a different type of SDA was used for LTA zeolite powder synthesis. SDA-F used in Example 2 was a material prepared by a fluorine direct substitution process, and was obtained through the following procedure and named SDA-F-2. Specifically, 1,2-DMI-4 MB-OH crystal was prepared in the same manner as SDA-F-1 in Example 1 before fluorine substitution, and was then dissolved in 100 g of distilled water to afford a 1,2-DMI-4 MB-OH aqueous solution. Thereafter, 2 g of 50% HF was diluted about tenfold, added dropwise to the 1,2-DMI-4 MB-OH aqueous solution, stirred and dried through evaporation, thereby yielding a 33% 1,2-DMI-4 MB-F aqueous solution.

Examples 3 to 5: SDA-F-Based Copper-Impregnated LTA Zeolite Catalyst

Copper-impregnated LTA zeolite catalysts were prepared in the same manner as in Example 1, with the exception that the SDA-F used in Examples 3 to 5 was SDA-F-1 and the synthesis scale was changed to about 0.3-30 L.

Examples 6 to 8: SDA-F-Based Copper-Impregnated LTA Zeolite Catalyst

Copper-impregnated LTA zeolite catalysts were prepared in the same manner as in Example 5, with the exception that the SDA-F used in Examples 6 to 8 was SDA-F-1 and the H2O/Si molar ratio was changed to 2.5-20.

Examples 9 to 11: SDA-F-Based Copper-Impregnated LTA Zeolite Catalyst

Copper-impregnated LTA zeolite catalysts were prepared in the same manner as in Example 5, with the exception that the SDA-F used in Examples 9 to 11 was SDA-F-1 and the synthesis conditions were changed from a single-temperature synthesis to a two-stage temperature-elevating synthesis and from 24 hr to 20 hr.

Examples 12 to 16: SDA-F-Based Copper-Impregnated LTA Zeolite Catalyst

Copper-impregnated LTA zeolite catalysts were prepared in the same manner as in Example 5 at the same synthesis temperature as in Example 11, with the exception that the SDA-F used in Examples 12 to 16 was SDA-F-1 and the Si/Al molar ratio was changed to 8-30.

Examples 17 and 18: SDA-F-Based Copper-Impregnated LTA Zeolite Catalyst

Copper-impregnated LTA zeolite catalysts were prepared in the same manner as in Example 5, with the exception that the SDA-F used in Examples 17 and 18 was SDA-F-1 and the synthesis temperature was changed to 160° C. and 190° C. in Examples 17 and 18, respectively.

Example 19: SDA-F-Based Copper-Impregnated LTA Zeolite Catalyst

A copper-impregnated LTA zeolite catalyst was prepared in the same manner as in Example 5, with the exception that the SDA-F used in Example 19 was SDA-F-1, and, as the copper-impregnating process, ion exchange was performed three times using copper acetate of Comparative Example 1.

Comparative Examples 1 to 4: SDA-Based Copper-Impregnated LTA Zeolite Catalyst

Comparative Examples 1 to 4 were performed in the same manner as in Ben W. Boal et al. (27 CHEM. MATER., 7774-79 (2015)) and Test Example 1 of Korean Patent Application Publication No. 10-2017-0095118, with the exception that different synthesis scales were applied. Specifically, SDA and F materials were separately used and prepared, TEOS was used as a silica source, and hydrothermal reaction was carried out at 175° C. for 17 hr. After the synthesis was complete, washing, drying and firing were performed, followed by ion exchange treatment using ammonia. Then, copper was impregnated by stirring for 6 hr in a 0.01 M copper acetate (CuA) aqueous solution, followed by filtration, washing and drying in an oven at 60° C. for 12 hr. The above procedure was repeated three times, followed by firing at 550° C. for 4 hr, thereby yielding a copper-impregnated LTA zeolite catalyst.

Comparative Example 5: SDA-Based Copper-Impregnated LTA Zeolite Catalyst

A copper-impregnated LTA zeolite catalyst was prepared in the same manner as in Comparative Example 4, with the exception of SDA and F materials being separately used and prepared and the synthesis conditions being changed from a single-temperature synthesis to a two-step temperature-elevating synthesis and from 24 hr to 20 hr.

Comparative Example 6: SDA-F-Based Copper-Impregnated LTA Zeolite Catalyst

A copper-impregnated LTA zeolite catalyst was prepared in the same manner as in Comparative Example 4, with the exception of the SDA used in Comparative Example 6 being SDA-F-1.

Comparative Examples 7 and 8: SDA-Based Copper-Impregnated LTA Zeolite Catalyst

Copper-impregnated LTA zeolite catalysts were prepared in the same manner as in Example 5, with the exception of SDA and F materials being separately used and prepared and the F materials being HF and NH4F, respectively.

Comparative Examples 9 and 10: SDA-Based Copper-Impregnated LTA Zeolite Catalyst Copper-impregnated LTA zeolite catalysts were prepared in the same manner as in Examples 7 and 8, with the exception of SDA and F materials being separately used and prepared and that Ludox HS-40 (Na form) being used as the Si material in lieu of Ludox AS-40 (NH3-form).

Figure 4:
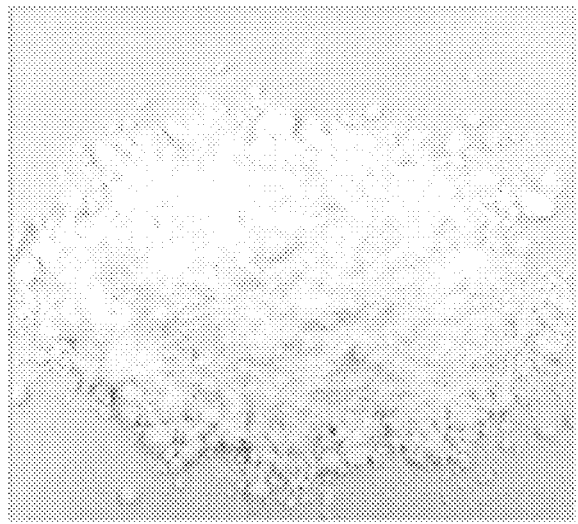
FIG. 4 shows photographs of the zeolite powder and the copper-impregnated zeolite powder catalyst prepared in Example 5 of the present invention.
Figure 4:

The synthesis conditions of Examples 1 to 19 and Comparative Examples 1 to 10 are summarized in Table 1 below, and the results of analyses of the properties after synthesis and copper ion exchange in Examples 1 to 19 and Comparative Examples 1 to 10 are summarized in Table 2 below. In particular, images of the LTA zeolite and the copper-impregnated LTA zeolite prepared in Example 5 are representatively shown in FIG. 4.

TABLE 1

| No. | Si material | Cu material | F addition | Synthesis conditions | | | | Synthetic vessel scale (L) |
| --- | --- | --- | --- | --- | --- | --- | --- | --- |
| | | | | H$_2$O/Si (molar ratio) | Si/Al (molar ratio) | Temp. (° C.) | Time (hr) | |
| Example 1 | Ludox AS-40 | TACN | SDA-F-1 | 5 | 15 | 175 | 24 | 0.04 |
| Example 2 | Ludox AS-40 | TACN | SDA-F-2 | 5 | 15 | 175 | 24 | 0.04 |
| Example 3 | Ludox AS-40 | TACN | SDA-F-1 | 5 | 15 | 175 | 24 | 0.3 |
| Example 4 | Ludox AS-40 | TACN | SDA-F-1 | 5 | 15 | 175 | 24 | 2.0 |
| Example 5 | Ludox AS-40 | TACN | SDA-F-1 | 5 | 15 | 175 | 24 | 30.0 |
| Example 6 | Ludox AS-40 | TACN | SDA-F-1 | 2.5 | 15 | 175 | 24 | 30.0 |
| Example 7 | Ludox AS-40 | TACN | SDA-F-1 | 10 | 15 | 175 | 24 | 30.0 |
| Example 8 | Ludox AS-40 | TACN | SDA-F-1 | 20 | 15 | 175 | 24 | 30.0 |
| Example 9 | Ludox AS-40 | TACN | SDA-F-1 | 5 | 15 | 80/175 | 5/15 | 30.0 |
| Example 10 | Ludox AS-40 | TACN | SDA-F-1 | 5 | 15 | 100/175 | 5/15 | 30.0 |
| Example 11 | Ludox AS-40 | TACN | SDA-F-1 | 5 | 15 | 120/175 | 5/15 | 30.0 |
| Example 12 | Ludox AS-40 | TACN | SDA-F-1 | 5 | 8 | 120/175 | 5/15 | 30.0 |
| Example 13 | Ludox AS-40 | TACN | SDA-F-1 | 5 | 10 | 120/175 | 5/15 | 30.0 |
| Example 14 | Ludox AS-40 | TACN | SDA-F-1 | 5 | 12 | 120/175 | 5/15 | 30.0 |
| Example 15 | Ludox AS-40 | TACN | SDA-F-1 | 5 | 20 | 120/175 | 5/15 | 30.0 |
| Example 16 | Ludox AS-40 | TACN | SDA-F-1 | 5 | 30 | 120/175 | 5/15 | 30.0 |
| Example 17 | Ludox AS-40 | TACN | SDA-F-1 | 5 | 15 | 160 | 24 | 30.0 |
| Example 18 | Ludox AS-40 | TACN | SDA-F-1 | 5 | 15 | 190 | 24 | 30.0 |
| Example 19 | Ludox AS-40 | CuA | SDA-F-1 | 5 | 15 | 175 | 24 | 30.0 |
| Comparative Example 1 | TEOS | CuA | HF | 5 | 15 | 175 | 24 | 0.04 |
| Comparative Example 2 | TEOS | CuA | HF | 5 | 15 | 175 | 24 | 0.3 |
| Comparative Example 3 | TEOS | CuA | HF | 5 | 15 | 175 | 24 | 2.0 |
| Comparative Example 4 | TEOS | CuA | HF | 5 | 15 | 175 | 24 | 30.0 |
| Comparative Example 5 | TEOS | CuA | HF | 5 | 15 | 120/175 | 5/15 | 30.0 |
| Comparative Example 6 | TEOS | CuA | SDA-F-1 | 5 | 15 | 175 | 24 | 30.0 |
| Comparative Example 7 | Ludox AS-40 | TACN | HF | 5 | 15 | 175 | 24 | 30.0 |
| Comparative Example 8 | Ludox AS-40 | TACN | NH4F | 5 | 15 | 175 | 24 | 30.0 |
| Comparative Example 9 | Ludox HS-40 | TACN | HF | 5 | 15 | 175 | 24 | 30.0 |
| Comparative Example 10 | Ludox HS-40 | TACN | NH4F | 5 | 15 | 175 | 24 | 30.0 |

TABLE 2

| No. | Crystal phase | Crystallinity (%) | Particle size (μm) | Specific surface area (m$^2$/g) | Residual F content (%) | Si/Al (molar ratio) | Cu/Al (molar ratio) |
| --- | --- | --- | --- | --- | --- | --- | --- |
| Example 1 | LTA | 100 | 0.5-2 | 805 | 0.0074 | 15.1 | 0.49 |
| Example 2 | LTA | 100 | 0.5-2 | 783 | 0.0071 | 15.3 | 0.48 |
| Example 3 | LTA | 100 | 0.5-2 | 790 | 0.0080 | 15.2 | 0.49 |
| Example 4 | LTA | 100 | 0.5-2 | 792 | 0.0075 | 15.1 | 0.49 |
| Example 5 | LTA | 100 | 0.5-2 | 797 | 0.0072 | 15.2 | 0.49 |
| Example 6 | AMOR | — | — | — | — | — | — |
| Example 7 | LTA | 92 | 1-3 | 760 | 0.0070 | 14.9 | 0.49 |
| Example 8 | LTA + AMOR | 51 | 1-3 | 630 | 0.0035 | 14.8 | 0.50 |
| Example 9 | AMOR | — | — | — | — | — | — |
| Example 10 | LTA + AMOR | 62 | 0.5-2 | 687 | 0.0042 | 16.0 | 0.50 |
| Example 11 | LTA | 100 | 1-2 | 801 | 0.0069 | 15.1 | 0.49 |
| Example 12 | LTA | 95 | 0.5-1 | 770 | 0.0083 | 8.7 | 0.53 |
| Example 13 | LTA | 98 | 0.5-2 | 781 | 0.0079 | 10.6 | 0.51 |
| Example 14 | LTA | 99 | 0.5-2 | 783 | 0.0081 | 12.1 | 0.49 |
| Example 15 | LTA | 100 | 0.5-2 | 792 | 0.0072 | 19.3 | 0.49 |
| Example 16 | LTA | 100 | 0.5-2 | 789 | 0.0077 | 31.4 | 0.50 |
| Example 17 | LTA + AMOR | 42 | 0.5-2 | 584 | 0.0032 | 17.1 | 0.52 |
| Example 18 | LTA | 100 | 4-5 | 780 | 0.0091 | 14.8 | 0.49 |
| Example 19 | LTA | 100 | 0.5-2 | 810 | 0.0072 | 15.3 | 0.49 |
| Comparative Example 1 | LTA | 100 | 2-3 | 792 | 0.028 | 15.1 | 0.52 |
| Comparative Example 2 | LTA | 100 | 2-3 | 795 | 0.026 | 15.0 | 0.49 |
| Comparative Example 3 | LTA | 92 | 2-3 | 768 | 0.024 | 14.8 | 0.49 |
| Comparative Example 4 | LTA + AMOR | 65 | 1-10 | 682 | 0.032 | 12.5 | 0.49 |
| Comparative Example 5 | LTA + AMOR | 69 | 1-3 | 693 | 0.031 | 12.8 | 0.48 |
| Comparative Example 6 | LTA + AMOR | 71 | 1-3 | 704 | 0.030 | 13.1 | 0.49 |
| Comparative Example 7 | LTA | 92 | 0.5-2 | 776 | 0.016 | 15.0 | 0.50 |

TABLE 2-continued

| No. | Crystal phase | Crystallinity (%) | Particle size (μm) | Specific surface area (m²/g) | Residual F content (%) | Si/Al (molar ratio) | Cu/Al (molar ratio) |
| --- | --- | --- | --- | --- | --- | --- | --- |
| Comparative Example 8 | LTA | 90 | 0.5-2 | 760 | 0.015 | 15.1 | 0.49 |
| Comparative Example 9 | LTA | 91 | 0.5-2 | 763 | 0.016 | 15.2 | 0.49 |
| Comparative Example 10 | LTA | 91 | 0.5-2 | 762 | 0.016 | 15.1 | 0.50 |

As is apparent from the results of Table 2, in Examples 1 to 5 and Comparative Examples 1 to 4, properties such as crystallinity, particle size, specific surface area, etc. of zeolites prepared on different synthesis scales varied depending on the phases of the materials upon synthesis using different silicon sources, SDA and F sources.

Figure 2:
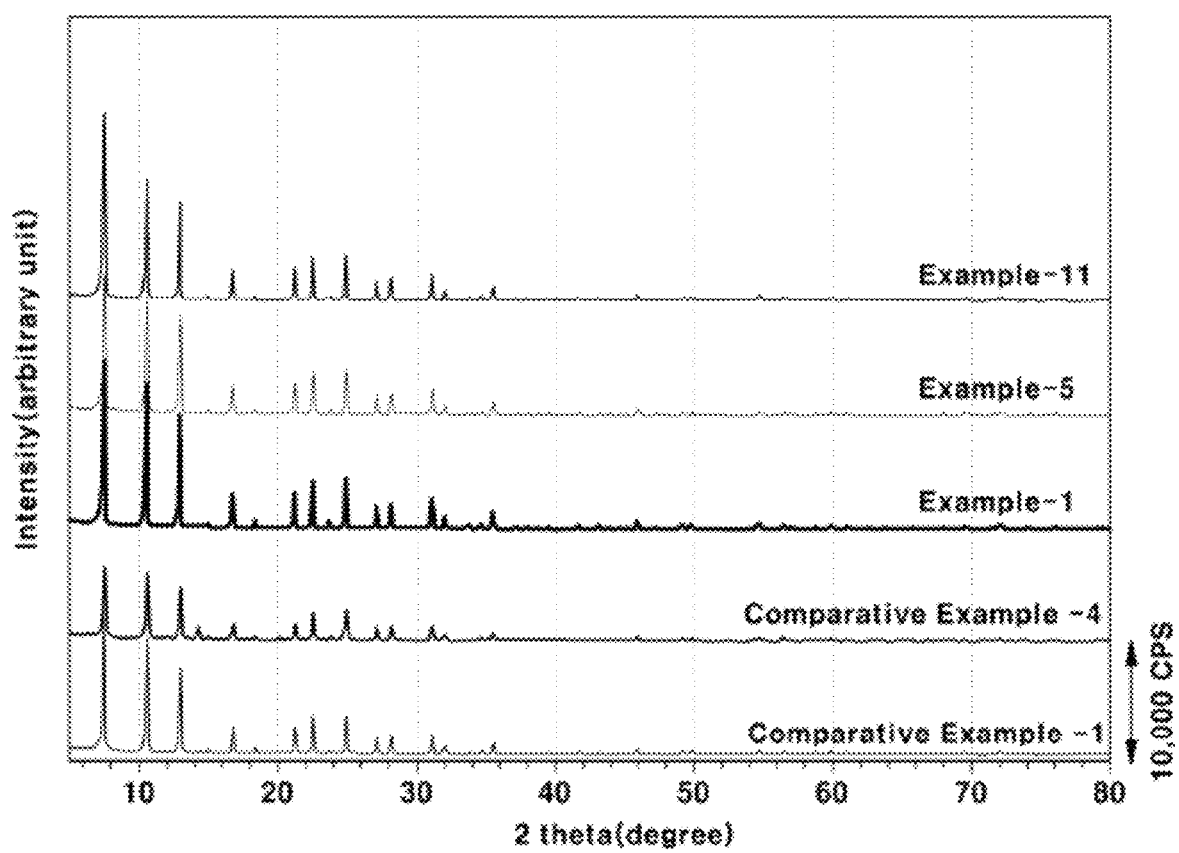
FIG. 2 shows the results of X-ray diffraction pattern of the zeolite powder prepared in Examples 1, 5 and 11 of the present disclosure and Comparative Examples 1 and 4.
Figure 3:
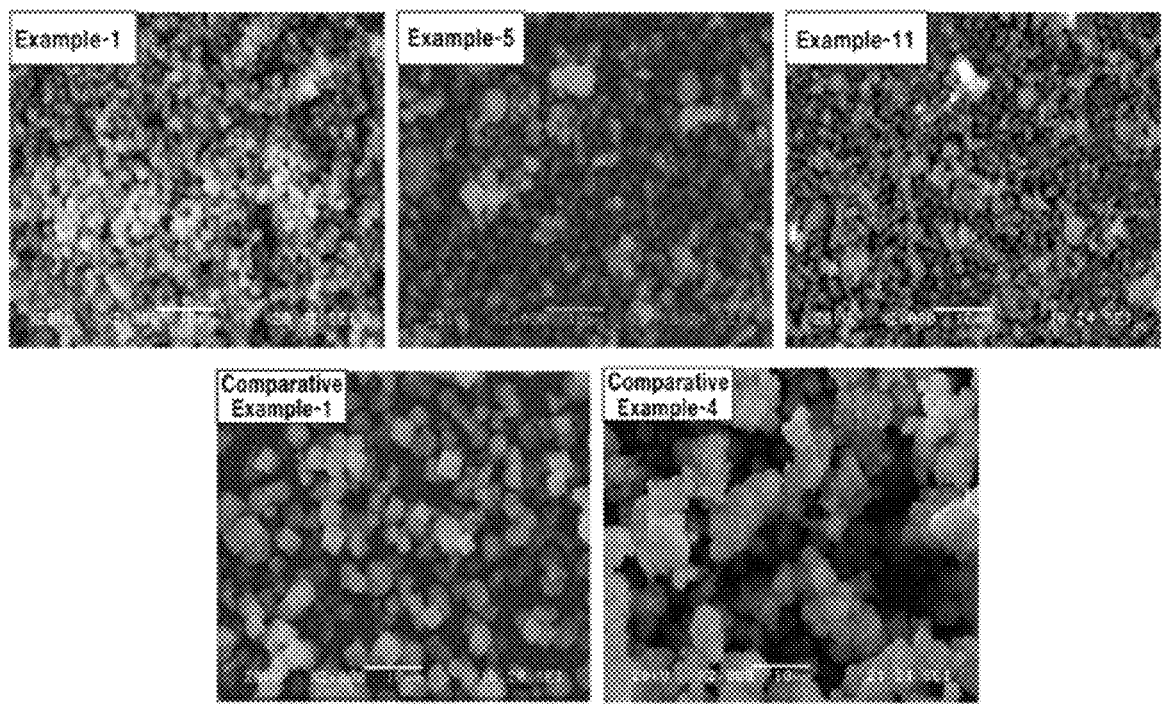
FIG. 3 shows electron microscope images of the zeolite powder prepared in Examples 1, 5 and 11 of the present disclosure and Comparative Examples 1 and 4.

In Examples 1 to 5, Ludox-AS-40 was used as the silicon source, and SDA-F-1 and SDA-F-2, which were substituted with F, were used as SDA. As a result, high-purity zeolites having uniform particle sizes and high crystallinity were synthesized on the 0.4 L-30 L scale. This is deemed to be because all starting materials were in a liquid phase when mixed in the preparation of the synthetic mother liquor of Examples 1 to 5, making it possible to uniformly mix the materials to thereby prepare zeolites having consistent properties regardless of the scale of the synthetic vessel. In contrast, in Comparative Examples 1 to 4, when TEOS as the silicon source, SDA and HF were sequentially used, the average particle size distribution gradually widened and the crystallinity of zeolite decreased with an increase in the synthesis scale. This is considered to be because the sequential addition of TEOS+SDA+HF in the preparation of the synthetic mother liquor changed the state of the final mother liquor to a solid phase and also because the mother liquor phase was uniform when the synthetic vessel was small but nonuniformity of the synthetic mother liquor increased locally with an increase in the vessel size, thus affecting the purity of the final product. The XRD pattern results of Examples 1, 5 and 11 and Comparative Examples 1 and 4 and the electron microscope images of the particle sizes thereof are shown in FIGS. 2 and 3.

Moreover, in order to evaluate the effects of TEOS and SDA-F of Example 5 and Comparative Examples 4 and 6 to 8, when TEOS was used as the silicon source, zeolite having low crystallinity and a low Si/Al ratio was synthesized regardless of the SDA source or the F source. In the case where Ludox AS-40 was used as the silica source, even when using HF or NH4F as the F source, high crystallinity resulted compared to Comparative Example 4 using TEOS, but the purity was lowered by about 10% compared to Example 5 using SDA-F-1. Thus, it was confirmed that the silica source and the fluorine state were very important factors in the synthesis of zeolite and thus the purity and properties varied depending thereon. In Examples 6 to 8, in which zeolite was synthesized by changing the H2O/Si molar ratio in the synthetic mother liquor, zeolite crystals were not formed at a molar ratio of 2.5, below the reference value of 5.0, and the crystallinity was gradually decreased at molar ratios above 5.0, namely 10 and 20. In Examples 9 to 16, zeolite was synthesized by applying the two-step temperature-elevating synthesis process to improve energy efficiency in the preparation process, not the conventional single-temperature synthesis process. In Examples 9 to 11, zeolites were synthesized by adjusting the first temperature desired for nucleation during the two-step temperature-elevating process, and thus sufficient energy for nucleation was not supplied at a temperature lower than 120° C., resulting in low crystallinity. Upon the two-step synthesis at 120° C./175° C., the same results as in Example 5 were exhibited despite the shortened synthesis time compared to the conventional single-temperature synthesis process, from which it is expected that zeolite prepared through the two-step temperature-elevating synthesis process is capable of showing high SCR activity. In addition, it can be seen from Examples 12 to 16 that synthesis is possible through the two-step temperature-elevating synthesis process even at a wide Si/Al ratio. In Examples 17 and 18, zeolite was synthesized under the condition that the synthesis temperature was adjusted to 160° C. and 190° C., and thus synthesis at 160° C. resulted in low crystallinity, irregular particle size and insufficient energy for crystal growth, and upon synthesis at 190° C., pure zeolite was prepared and the particle size was increased by about 2-3 μm compared to Example 5. Thus, it was found that the particle size was controlled using the synthesis temperature. Moreover, based on the results of comparison of F content in zeolite subjected to heat treatment as the post-treatment after termination of synthesis, F content was about 50-60% lower in zeolites using SDA-F in Examples 1 to 18 than in zeolites of the comparative examples sequentially using SDA and F. Thus, it was found that the use of SDA-F was capable of synthesizing zeolite in an environmentally friendly manner in which the amount of air pollutant F was reduced. Also, in Examples 5 and 19, copper was impregnated in the synthesized zeolite using different types of copper precursors during the copper-impregnating process at a consistent Cu/Al molar ratio of 0.49. Therefore, it can be concluded that copper-impregnated zeolite suitable for mass production can be prepared using the impregnating process once using tetraammine copper nitrate (TACN), rather than the impregnating process three times using CuA (Cu acetate).

Test Example 1: Evaluation of Hydrothermal Stability and Base Durability of Catalyst Among Examples 1 to 19 and Comparative Examples 1 to 10, the copper-impregnated LTA zeolites having crystallinity of 90% or more were evaluated for stability after hydrothermal treatment at high temperatures and for durability after exposure to a base. To this end, the following preparation process was performed, and the results thereof are shown in Table 3 below. Additionally, Comparative Example 4, the synthesis scale of which was greater than that of Comparative Example 1, exhibited low crystallinity but was subjected to hydrothermal treatment and base treatment for comparison with Example 5.

Figure 5:
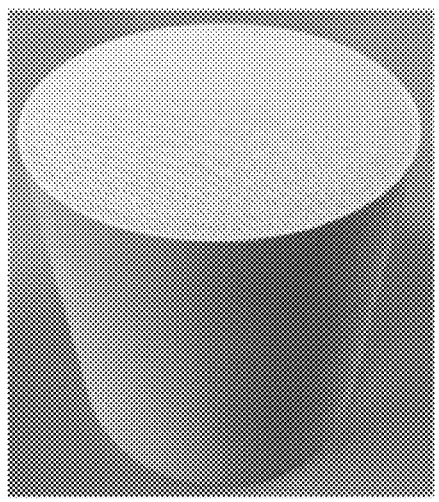
FIG. 5 shows photographs and electron microscope images of copper-impregnated zeolite catalysts applied on a honeycomb and a filter using the zeolite prepared in Example 5 of the present disclosure.
Figure 5:
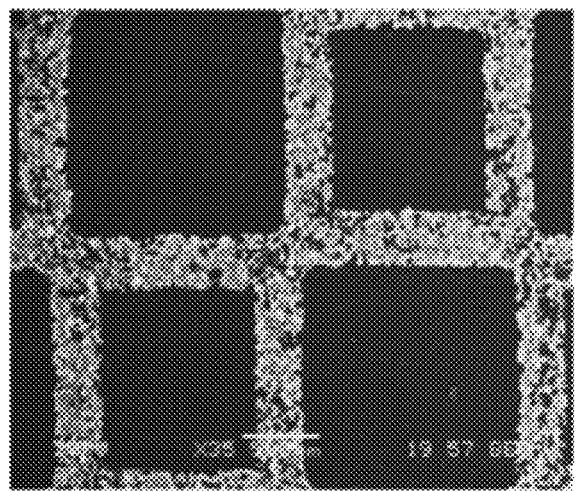
Figure 5:
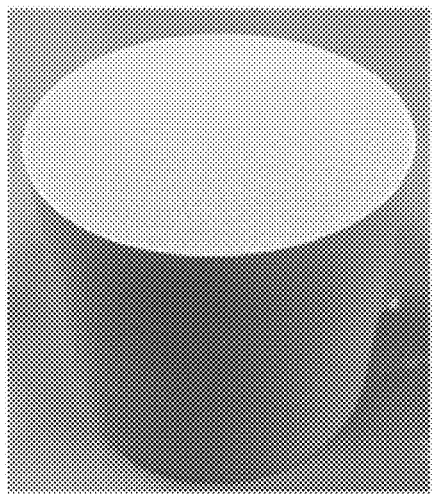
Figure 5:
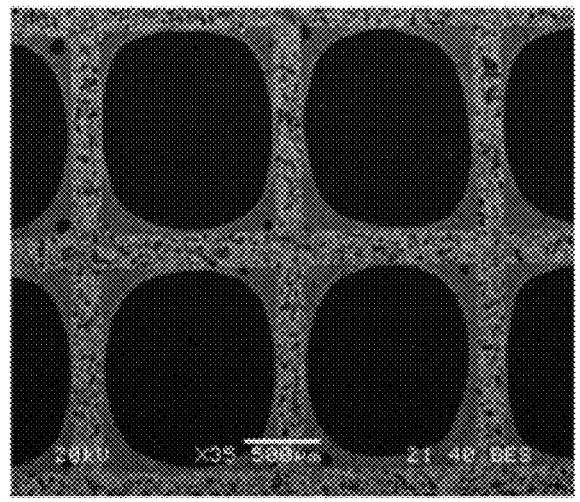

Copper-impregnated LTA zeolite catalyst samples were manufactured in a powder phase when using the catalyst synthesized in a synthetic vessel having a capacity of 0.04-2 L and through application on a honeycomb or a filter when using a catalyst synthesized in a synthetic vessel having a capacity of 30 L. The evaluation was performed using a sample obtained through application on a filter. The sample manufactured by coating the filter or honeycomb with the catalyst of Example 5 is representatively illustrated in a photograph and an electron microscope image in FIG. 5.

For the evaluation of hydrothermal stability, samples were manufactured under more severe conditions than the typical SCR reaction temperature of 500-700° C. (based on the results of analysis of zeolites after hydrothermal treatment at 600° C., all of the examples and comparative examples exhibited the same crystallinity as before the hydrothermal treatment, and thus a low-temperature hydrothermal treatment process is not described herein because it is difficult to deduce unique differences for samples).

The zeolite powder prepared in the examples and comparative examples was placed in a heat treatment apparatus enabling airflow, and the temperature was elevated from room temperature to 900° C. at a ratio of 10% water vapor/90% air at a GHSV of 20,000 h−1 and then maintained for 1 hr, thus preparing hydrothermally treated catalysts.

For the evaluation of base durability, the zeolite powder catalyst or filter catalyst prepared above was placed in a double jacket containing an ammonia aqueous solution at a pH of 9.5, heated to 70° C. and allowed to stand under severe conditions of 100 hr, followed by filtration and drying, thereby preparing base-treated catalysts. The hydrothermally treated zeolites and base-treated zeolites thus obtained were calculated for crystallinity through XRD to determine whether the zeolite skeleton was collapsed, and the residual F content thereof was calculated through XRF.

As is apparent from the results of Table 3, the crystallinity after hydrothermal treatment was about 10-20% higher in zeolites of Examples 1 to 5 using SDA-F than in zeolites of Comparative Examples 1 to 4 sequentially using SDA and F. As for the residual F content after hydrothermal treatment, the dissolution of F was higher in Comparative Examples 1 to 4 sequentially using SDA and F, from which most of the zeolite skeleton is assumed to have collapsed during hydrothermal treatment. Thus, it can be found that, when the SDA-F template was used, the extent of densification and stabilization of the zeolite skeleton was higher and the main skeleton of zeolite was maintained even after hydrothermal treatment at high temperatures. Based on the results of Examples 5 and 11 using the two-step temperature-elevating synthesis process, skeletal strength and hydrothermal stability after hydrothermal treatment were exhibited to be equivalent to or higher than those of zeolites prepared using the single-temperature synthesis process. In Examples 12 to 16, hydrothermal stability was gradually increased with an increase in the Si/Al molar ratio, indicating that the greater the aluminum content in the composition, the more vulnerable the composition was to water. In Example 5 and Comparative Examples 7 and 8, in which the same silicon source was used and different SDA states were applied, the crystallinity after hydrothermal treatment was lower in Comparative Examples 7 and 8 than in Example 5, from which it can be found that the crystallinity after hydrothermal treatment is affected more by the SDA state than by the silicon source. In Examples 5 and 19, in which the copper-impregnated zeolites were synthesized using different types of copper precursors during the impregnating of copper in zeolite, the same crystallinity after hydrothermal treatment resulted. Moreover, the results after base treatment were generally similar to those after hydrothermal treatment, and

TABLE 3

| No. | Crystallinity in fresh state (%) | Residual F content in fresh state (%) | Crystallinity after hydrothermal treatment (%) | Residual F content after hydrothermal treatment (%) | Crystallinity after base treatment (%) |
|---|---|---|---|---|---|
| Example 1 | 100 | 0.0074 | 51 | 0.0027 | 35 |
| Example 2 | 100 | 0.0071 | 51 | 0.0026 | 33 |
| Example 3 | 100 | 0.0080 | 52 | 0.0024 | 35 |
| Example 4 | 100 | 0.0075 | 51 | 0.0019 | 37 |
| Example 5 | 100 | 0.0072 | 52 | 0.0021 | 38 |
| Example 7 | 92 | 0.0070 | 48 | 0.0017 | 29 |
| Example 11 | 100 | 0.0069 | 53 | 0.0018 | 40 |
| Example 12 | 95 | 0.0083 | 15 | 0.0016 | 15 |
| Example 13 | 98 | 0.0079 | 21 | 0.0015 | 19 |
| Example 14 | 99 | 0.0081 | 46 | 0.0019 | 27 |
| Example 15 | 100 | 0.0072 | 52 | 0.0021 | 38 |
| Example 16 | 100 | 0.0077 | 54 | 0.0021 | 41 |
| Example 18 | 100 | 0.0091 | 52 | 0.0025 | 35 |
| Example 19 | 100 | 0.0072 | 51 | 0.0021 | 32 |
| Comparative Example 1 | 100 | 0.028 | 31 | 0.0018 | 15 |
| Comparative Example 2 | 100 | 0.026 | 40 | 0.0018 | 14 |
| Comparative Example 3 | 92 | 0.024 | 26 | 0.0017 | 10 |
| Comparative Example 4 | 65 | 0.032 | 23 | 0.0019 | 7 |
| Comparative Example 7 | 92 | 0.016 | 32 | 0.0016 | 10 |
| Comparative Example 8 | 90 | 0.015 | 41 | 0.0016 | 11 |
| Comparative Example 9 | 91 | 0.016 | 42 | 0.0019 | 13 |
| Comparative Example 10 | 91 | 0.016 | 42 | 0.0020 | 14 | the skeleton of the zeolite synthesized using SDA-F after base treatment was maintained as strong as about 2 to 3 times that of the zeolite synthesized sequentially using SDA and F.

Test Example 2: Evaluation of SCR Activity of Catalyst

Among Examples 1 to 19 and Comparative Examples 1 to 10, zeolites having crystallinity of 100% were evaluated for nitrogen oxide (NOx) conversion performance after hydrothermal treatment through the following procedure. The results are shown in Table 4 below and in FIGS. 6 and 7. Additionally, Comparative Example 4, the synthesis scale of which was greater than that of Comparative Example 1, exhibited low crystallinity but was subjected to performance evaluation after hydrothermal treatment for comparison with Example 5.

Copper-containing LTA zeolite catalyst samples were manufactured in a powder phase when using a catalyst synthesized in a synthetic vessel having a capacity of 0.04-2 L and through application on a filter when using a catalyst synthesized in a synthetic vessel having a capacity of 30 L.

The reaction gas in a reactor was composed of 500 ppm of nitrogen monoxide (NO), 500 ppm of ammonia ($NH_3$), 200 ppm of carbon monoxide (CO), 5% of carbon dioxide ($CO_2$), 9.5% of oxygen and 5% of water in a nitrogen gas atmosphere, and the gas hourly space velocity (GHSV) of the reaction gas was 80,000 h−1. The reaction temperature was elevated from 150° C. to 600° C. at the time of introduction of the reaction gas into the reactor, and NOx conversion efficiency was measured.

formance of Examples 1 to 4 was evaluated to be about 10% higher than in Comparative Examples 1 and 2 in the high temperature range. Compared to the catalysts before hydrothermal treatment, the extent of reduction of the conversion efficiency was also lower, resulting in higher catalyst performance stability. These results are consistent with the results of comparison of crystallinity of Examples 1 to 4 and Comparative Examples 1 and 2 after hydrothermal treatment. Therefore, Examples 1 to 4, in which the zeolite skeleton was strong, exhibited high NOx treatment efficiency even under more severe treatment conditions.

Based on the results of Examples 5, 11 and 19 and Comparative Example 4, in which the samples were manufactured by coating a filter for actual vehicle SCR using the zeolite catalyst synthesized in a synthetic vessel having a capacity of 30 L, Examples 5 and 19 exhibited results very similar to those of the powder catalyst of Example 1, from which it can be confirmed that zeolite synthesis uniformity was maintained upon mass synthesis in comparison with synthesis on small scales. The zeolite catalyst of Example 11 was also similar in terms of performance after hydrothermal treatment and the extent of reduction in conversion efficiency compared to Example 1, indicating that the zeolite produced in the shortened synthesis time through the two-step temperature-elevating hydrothermal synthesis process manifested the same properties as those of the zeolite produced through the single-temperature synthesis process. In contrast, in Comparative Example 4, the NOx conversion performance in the high temperature range after hydrothermal treatment was very low and the conversion efficiency was reduced by about 3 times compared to Example 5,

TABLE 4

| No. | $NO_x$ conversion efficiency of catalyst before hydrothermal treatment | | $NO_x$ conversion efficiency of catalyst after hydrothermal treatment at 900° C. | | | |
|---|---|---|---|---|---|---|
| | Conversion efficiency at 300° C. (%) | Conversion efficiency at 600° C. (%) | Conversion efficiency at 300° C. (%) | Reduction in conversion efficiency (%) | Conversion efficiency at 600° C. (%) | Reduction in conversion efficiency (%) |
| Example 1 | 100 | 87 | 83 | 17 | 76 | 12.6 |
| Example 2 | 100 | 86 | 80 | 20 | 74 | 14.0 |
| Example 3 | 100 | 84 | 82 | 18 | 73 | 13.1 |
| Example 4 | 100 | 85 | 80 | 20 | 75 | 11.8 |
| Example 5 | 100 | 85 | 83 | 17 | 74 | 12.9 |
| Example 11 | 100 | 84 | 82 | 18 | 73 | 13.1 |
| Example 15 | 98 | 83 | 78 | 20 | 70 | 15.7 |
| Example 16 | 95 | 82 | 75 | 20 | 69 | 15.9 |
| Example 18 | 100 | 82 | 76 | 24 | 65 | 20.7 |
| Example 19 | 100 | 86 | 80 | 20 | 74 | 14.0 |
| Comparative Example 1 | 100 | 82 | 80 | 20 | 68 | 17.1 |
| Comparative Example 2 | 100 | 83 | 81 | 19 | 64 | 22.9 |
| Comparative Example 4 | 64 | 36 | 45 | 19 | 21 | 41.7 |

As is apparent from the results of Table 4, the copper-impregnated zeolite powder catalysts of Examples 1 to 4 using SDA-F and the copper-impregnated zeolite powder catalysts of Comparative Examples 1 and 2 sequentially using SDA and F showed that the NOx conversion efficiencies before hydrothermal treatment were similar in the low and high temperature ranges. On the other hand, when comparing the NOx conversion performance after 900° C. hydrothermal treatment, the catalysts of the examples and comparative examples showed the same performance in the low temperature range, whereas the NOx conversion perindicating that most of the LTA zeolite skeleton had collapsed. In Examples 15 and 16, the zeolite catalysts prepared at high Si/Al molar ratios exhibited low NOx conversion efficiency before hydrothermal treatment, and low activity even after hydrothermal treatment, compared to Example 5, indicating that there is an optimal Si/Al molar ratio for performance expression.

Therefore, it can be concluded that the zeolite according to the present disclosure exhibits high hydrothermal stability and base durability and thereby high NOx conversion efficiency compared to conventional zeolites.

In addition to the above variations of the present disclosure, which have been disclosed for illustrative purposes, those skilled in the art will appreciate that various modifications, additions and substitutions are possible, without departing from the scope and spirit of the present disclosure as disclosed in the accompanying claims.

What is claimed is:

1. A copper-impregnated LTA zeolite catalyst for selective catalytic reduction of nitrogen oxide, the catalyst comprising
a high-silica-content LTA zeolite in which copper is ion-exchanged,
wherein a silicon/aluminum (Si/Al) molar ratio is 8 to 30 and a particle size is 0.5 to 5.0 μm,
wherein the copper-impregnated LTA zeolite has a crystallinity of 50% or more after a hydrothermal treatment at 900° C. for 1 to 25 hours and a crystallinity of 30% or more after a base treatment, and
wherein in the base treatment, the catalyst is placed in an aqueous ammonia solution adjusted to a pH of 9.0 to 9.5, left to be heated at 50 to 70° C. for 100 to 200 hours, and then filtered and dried.

2. The catalyst of claim 1, wherein the particle size is 0.5 to 2.0 μm, a specific surface area is 700 m2/g or more, the Si/Al molar ratio is 8 to 16, a Cu/Al molar ratio is 0.45 to 0.5, and a residual fluorine (F) content in a skeleton of the catalyst is 0.02% or less.

3. The catalyst of claim 1, wherein a nitrogen oxide (NOx) conversion efficiency of the catalyst is 70% or more upon reaction with an ammonia reducing agent at 150° C. to 600° C. after the hydrothermal treatment at 900° C.

4. The catalyst of claim 1, which is applied to a selective catalytic reduction (SCR) or an SCR-catalyzed diesel particulate filter (SDPF) for an internal combustion engine exhaust system.

* * * * *

UNITED STATES PATENT AND TRADEMARK OFFICE
CERTIFICATE OF CORRECTION

PATENT NO. : 11,465,133 B2
APPLICATION NO. : 17/009235
DATED : October 11, 2022
INVENTOR(S) : Pyung Soon Kim et al.

It is certified that error appears in the above-identified patent and that said Letters Patent is hereby corrected as shown below:

On the Title Page

(71) Applicants:
"HYUNDAI MOTOR COMPANY, Seoul (KR)
KIA MOTORS COPORATION, Seoul (KR)
HEESUNG CATALYSTS CORPORATION, Siheung-si (KR)"
Should read:
--HYUNDAI MOTOR COMPANY, Seoul (KR)
KIA MOTORS CORPORATION, Seoul (KR)
HEESUNG CATALYSTS CORPORATION, Siheung-si (KR)--

(73) Assignees:
"HYUNDAI MOTOR COMPANY, Seoul (KR)
KIA MOTORS CORPORATION, Seoul (KR)
HEESUNA CATALYSTS CORPORATION, Siheung-si (KR)"
Should read:
--HYUNDAI MOTOR COMPANY, Seoul (KR)
KIA MOTORS CORPORATION, Seoul (KR)
HEESUNG CATALYSTS CORPORATION, Siheung-si (KR)--

Signed and Sealed this
Twentieth Day of December, 2022

Katherine Kelly Vidal
*Director of the United States Patent and Trademark Office*